US006405371B1

(12) United States Patent
Oosterhout et al.

(10) Patent No.: US 6,405,371 B1
(45) Date of Patent: Jun. 11, 2002

(54) NAVIGATING THROUGH TELEVISION PROGRAMS

(75) Inventors: Ronaldus H. T. Oosterhout, Eindhoven (NL); Robert A. Lambourne, Menlo Park, CA (US); Astrid Dobbelaar; Warner R. T. Ten Kate, both of Eindhoven (NL)

(73) Assignee: Konklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/090,104

(22) Filed: Jun. 3, 1998

(30) Foreign Application Priority Data

Jun. 3, 1997 (EP) .............................. 97201656

(51) Int. Cl.⁷ ........................ H04N 5/445; G06F 3/00; G06F 13/00
(52) U.S. Cl. ........................ 725/39; 348/906; 348/564; 348/570
(58) Field of Search ........................ 345/327; 348/906, 348/564, 563, 584, 569, 565, 570, 734; 725/39, 41, 45–7, 53

(56) References Cited

U.S. PATENT DOCUMENTS

| | | | | |
|---|---|---|---|---|
| 5,583,560 A | * | 12/1996 | Florin et al. .................... | 348/7 |
| 5,596,373 A | * | 1/1997 | White et al. ................. | 348/569 |
| 5,633,683 A | * | 5/1997 | Rosengren et al. ......... | 348/385 |
| 5,652,628 A | * | 7/1997 | Toyoshima et al. ......... | 348/569 |
| 5,699,106 A | * | 12/1997 | Matsubara et al. ........... | 348/13 |
| 5,699,107 A | * | 12/1997 | Lawler et al. ................ | 348/13 |
| 5,719,637 A | * | 2/1998 | Ohkura et al. .............. | 348/564 |
| 5,828,419 A | * | 10/1998 | Bruette et al. .............. | 348/563 |
| 5,841,483 A | * | 11/1998 | Shafer ......................... | 348/565 |
| 5,848,396 A | * | 12/1998 | Gerace ......................... | 705/10 |
| 5,926,230 A | * | 7/1999 | Niijima et al. .............. | 348/564 |
| 6,020,930 A | * | 1/2000 | Legrand ..................... | 348/569 |
| 6,147,714 A | * | 11/2000 | Terasawa et al. ........... | 348/564 |

FOREIGN PATENT DOCUMENTS

| | | |
|---|---|---|
| WO | 95 28794 A2 | 10/1995 |
| WO | WO9528794 | 10/1995 |
| WO | WO 95/28794 | * 10/1995 |

OTHER PUBLICATIONS

"The Personal Electronic Program Guide—Towards the Pre–Selection of Individual TV Programs", by M. Ehrmantraut, ACM 1996, pp. 242–251.

* cited by examiner

*Primary Examiner*—Andrew Faile
*Assistant Examiner*—Ngoc Vu

(57) ABSTRACT

A method of navigating through television programs is disclosed. A television receiver displays a mosaic image with sub-images representing the available programs. The receiver further receives an electronic program guide with program descriptions. Upon activating a "theme" button (42), the viewer can enter a desired program type, e.g. "movie". In response thereto, the brightness of the sub-images representing programs that are not desired is reduced. The user is thus assisted in navigating through programs he is interested in, while maintaining the mosaic structure he is familiar with, and without losing the association between channels and their positions on the mosaic screen.

3 Claims, 6 Drawing Sheets

NAVIGATING THROUGH TELEVISION PROGRAMS

FIELD OF THE INVENTION

The invention relates to a method of navigating through television programs. The invention also relates to a television receiver for carrying out such a method and to a television transmitter for transmitting signals which enable or help the television receiver to carry out the method.

BACKGROUND OF THE INVENTION

Recently, the transmission of electronic program guides (EPGs) has become an important issue in the field of television. An EPG assists the public in making selections from the large amount of television programs that are nowadays being offered, in particular since digital television transmission is becoming a mature technology. An EPG allows the user to obtain a "What's On Now" or "What's On Next" overview, and easily select a program of interest. To this end, descriptors defining properties of the programs such as scheduled broadcast dates and times, types of programs (for example, movies, entertainment, news, sports, etc.), rating, etc. are accommodated in the EPG.

Conventional EPG systems convey the program information along with one, usually analog, television signal. Television receivers display the information in a textual form, either alone or as an overlay over the currently selected television program.

OBJECT AND SUMMARY OF THE INVENTION

It is an object of the invention to provide a method of navigating through television programs which further enhances the convenience of using electronic program guides.

To this end, the invention provides a method of navigating through television programs, comprising the steps of displaying a plurality of television programs as a mosaic of sub-images on a display screen, receiving one or more descriptors defining respective properties of each television program, receiving a user command identifying a selected descriptor value, and perceptibly marking the sub-images corresponding to television programs which have the selected descriptor value.

A mosaic screen is an attractive and user-friendly interface for selecting a television program from a plurality of available programs. It is achieved by the invention that such a mosaic overview remains displayed when the viewer wants to know which television channel broadcasts a desired type of program, e.g. a movie. Not only do the non-marked sub-images remain on screen, they also stay at the same position in the mosaic independent of the number of television channels that currently broadcast a movie. Once the user has associated a channel with its position in the mosaic, he will appreciate that said association is not changed by the theme search. Moreover, a steady picture is obtained.

The marking of sub-images may take many forms. An asterix or other special symbol may be displayed near the sub-images, the relevant channel names may be highlighted, the border lines of the sub-images may change color, etc. It is also possible to modify the appearance of the sub-images representing programs that are not desired, i.e. the sub-images corresponding to television programs which do not have the selected descriptor value. In advantageous embodiments of the invention, the brightness, contrast, size, or refresh rate (up to freezing into a still picture) of said sub-images is reduced.

The mosaic screen may be composed locally by the receiver from the various receivable television channels. It may also be transmitted by a transmitter along with one or more television programs. Such a transmitter is disclosed in the Applicant's International Patent Application WO-A-95/28794. In accordance with the invention, the same transmitter also transmits, for each television program, the descriptors of said television program along with the mosaic signal. The above-mentioned receiver features can then be realized in a cost-effective manner. Preferably, the television programs, the mosaic signal and the descriptors are digitally encoded and multiplexed in a single bitstream.

DESCRIPTION OF EMBODIMENTS

Figure 1:
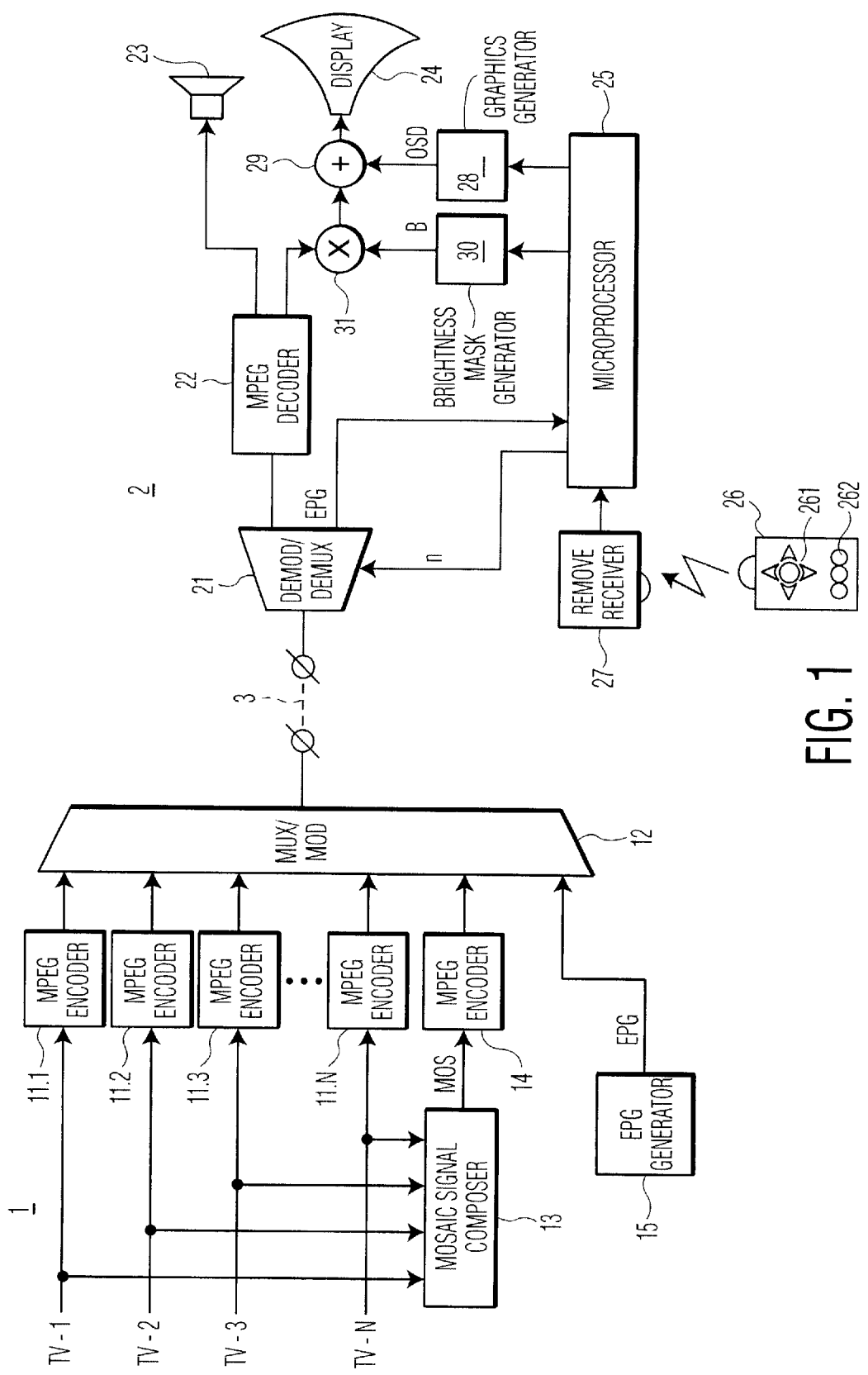
FIG. 1 shows a system comprising a transmitter and a receiver for carrying out the method in accordance with the invention.

FIG. 1 shows a system comprising a transmitter 1 and a receiver 2 in accordance with the invention. The transmitter 1 receives a plurality of television programs TV-1, TV-2, TV-3, .. TV-N. In the digital transmission system under consideration, the television signals are encoded by respective MPEG encoders 11.1, 11.2, 11.3, .. 11.N. The encoded signals are applied to a multiplexer and modulator 12 for transmission through a transmission channel 3 which may be a satellite, terrestrial or cable broadcast network.

The transmitter also comprises an electronic program guide (EPG) generator 15 which adds EPG data to the transmitted signal. Electronic program guides are known per se in the art. They include, for each transmitted TV channel, a program schedule for a given period of time. For each program, the EPG also includes a number of descriptors, such as scheduled broadcast dates and times, titles, types (for example, entertainment, news, sports, movies, etc.), parental ratings, etc.

Figure 2:
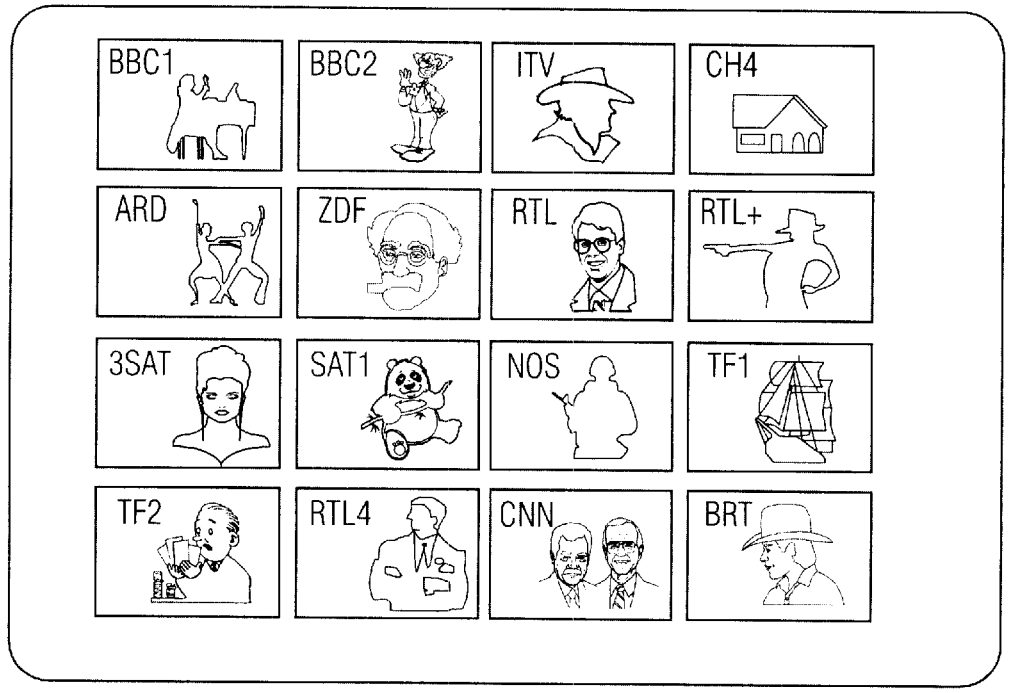
FIG. 2 shows a mosaic screen as transmitted by the transmitter shown in FIG. 1.

In an optional embodiment of the invention, the transmitter also comprises a mosaic signal-composing circuit 13 which receives the television signals of the television programs and creates a mosaic signal MOS of, for example, 4*4 sub-images as shown in FIG. 2. The mosaic signal is digitally encoded by an MPEG encoder 14 and added to the transmitted signal. In this embodiment, the EPG also includes data which links the position of each sub-image in the mosaic signal MOS with the program number n of the associated television program TV-n. Such a linking mechanism is disclosed in the International Patent Application WO-A-95/28794 cited above.

The receiver 2 comprises a demodulator and demultiplexer 21 for receiving a selected one of the television programs. A program is selected by applying its program number n to the demodulator and demultiplexer. The selected television signal is applied to an MPEG decoder 22 which decodes the audio component of the signal for reproduction by a speaker 23 and the video component of the signal for display on a display screen 24. The embedded EPG data is a further output signal of the demodulator and demultiplexer 21.

The receiver further comprises a microprocessor 25 which receives user control commands from a (remote) control device 26 through a remote control receiver 27. The microprocessor controls various conventional operations of the receiver in a further known manner. More particularly, a television program is selected by applying its program number n to the demodulator and demultiplexer 21. The microprocessor also receives the transmitted EPG data signal. The remote control device 26 has cursor control keys 261 and a special key 262 labelled "EPG".

The receiver further comprises a graphics generator 28 which is controlled by the microprocessor. An On-Screen-Display signal OSD is generated by this graphics generator and added to the video image on screen through an adder stage 29. In an optional embodiment, the receiver also comprises a brightness mask generator 30 which applies a brightness control signal B to a brightness control stage 31.

Figure 4:
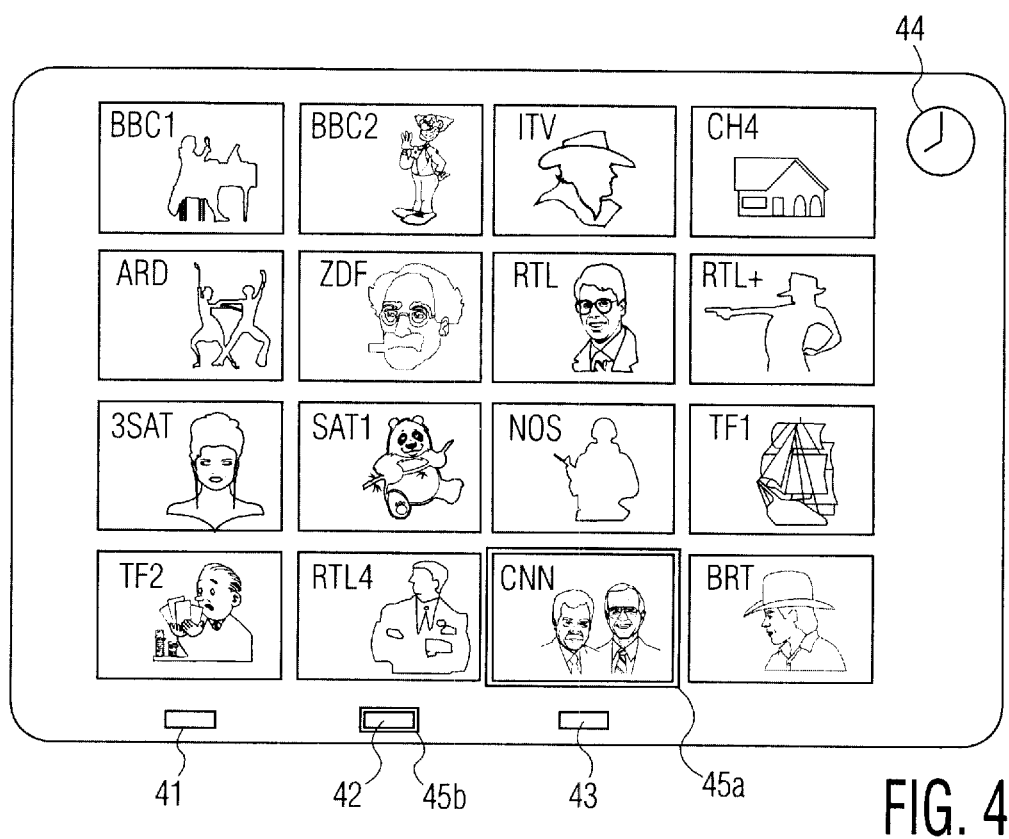
FIGS. 4–9 show examples of mosaic screens as displayed by the television receiver shown in FIG. 1.
Figure 3:
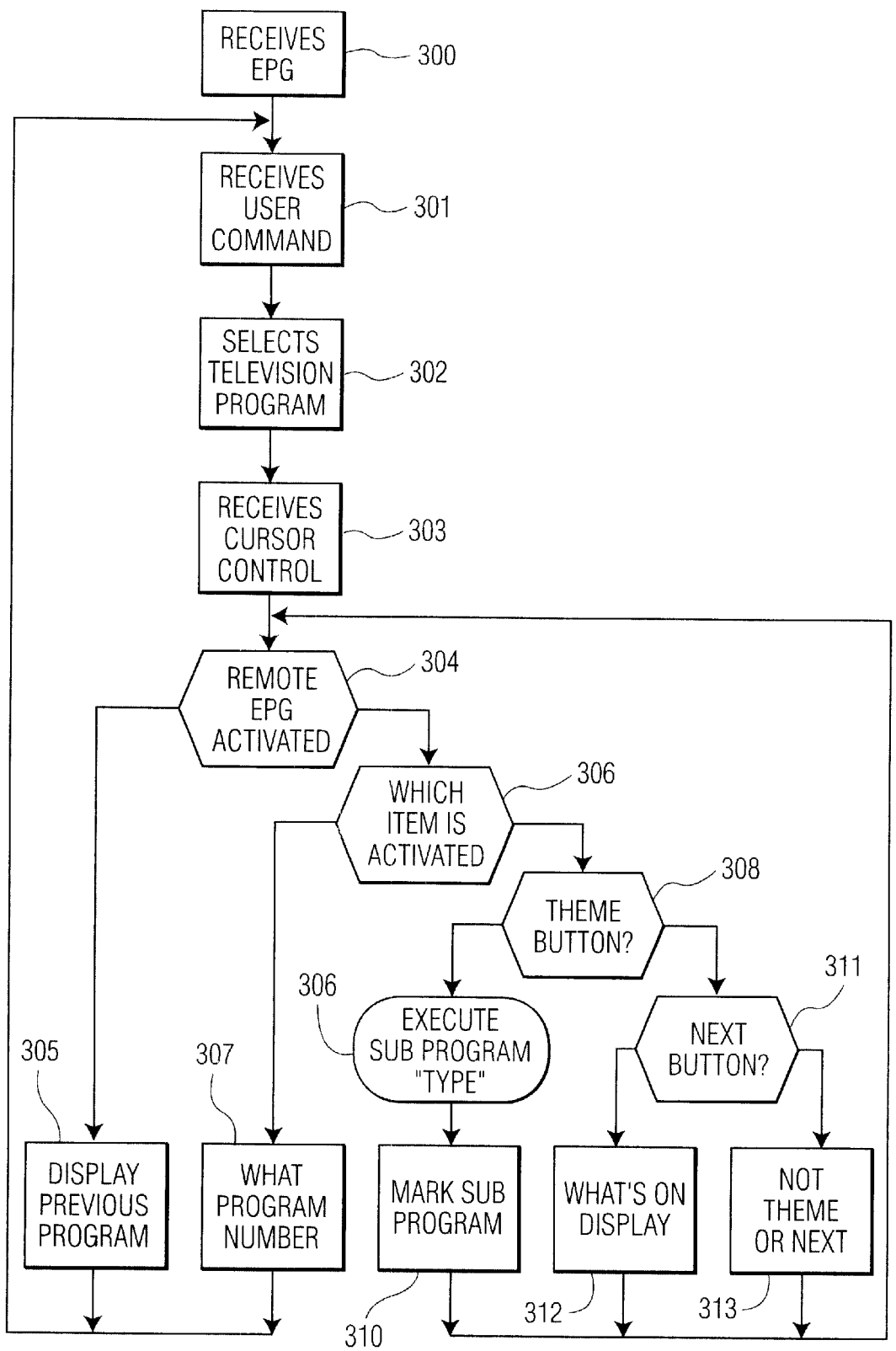
FIG. 3 shows a flow chart of a control program which is stored in and executed by a microprocessor shown in FIG. 1.

The operation of the receiver 2 is determined by a control program which is stored in and executed by the microprocessor 25. FIG. 3 shows a flow chart of this control program. In an initial step 300, the microprocessor receives the EPG data from the transmitter and stores this information in a memory. In a step 301, the microprocessor awaits reception of a predetermined user command which is issued by the remote control device upon depressing the "EPG" button (262 in FIG. 1). This command causes the program to enter an "EPG" operation mode. Other operation modes are not essential to the invention and therefore not further described. In a step 302, the microprocessor selects, from the available television programs, the program with the mosaic signal (see FIG. 2) and displays it on screen. In the step 302, the microcomputer also causes the graphics generator (28 in FIG. 1) to generate an On-Screen-Display signal OSD. More particularly, as is shown in FIG. 4, the OSD signal includes on-screen buttons such as a button 41 labelled "next", a button 42 labelled "theme", a button 43 labelled "zoom", and other useful information such as a clock 44.

In a step 303, the microprocessor receives cursor control commands from the remote control device and causes the graphics generator to display a cursor on screen. The cursor may take any convenient form. In FIG. 4, the cursor is shown as a framework around a selectable display item, such as a framework 45a around a sub-image or a framework 45b around an on-screen button. While moving the cursor across the sub-images on the mosaic screen with the cursor control keys (261 in FIG. 1), the receiver reproduces the audio signal of the associated television program.

In a step 304, it is checked whether the EPG button on the remote control device is pressed again. The EPG button is a toggle command to switch the mosaic screen on and off. If the key is pressed again, a step 305 is executed in which the previously selected television program is displayed. The program then returns to the step 301 to await a new EPG command.

In a step 306, the control program determines which one of the selected display items is activated by the user. If a sub-image is activated, the television program associated therewith is selected for full-screen display. To that end, the microprocessor processes, in a step 307, the data which links the position of each sub-image in the mosaic signal MOS with the program number n of the associated television program TV-n, and applies the relevant program number to the demodulator and demultiplexer. The control program then returns to the step 301 to await a new EPG command.

If the activated display item is an on-screen button, a step 308 is performed in which it is checked whether it is the "theme" button (42 in FIG. 4). In that case, the program executes a sub-program 309 which allows the user to input the type of television program he is currently interested in. In this example, it will be assumed that the viewer is interested in movies. The sub-program 309 displays a list of available program types such as "Entertainment", "News", "Sports","Movie", etc. Alternatively, there are on-screen buttons 42 for the various themes. Having learned the desired type of program, the sub-program 309 searches in the EPG data the television channels that are currently transmitting such a program, and derives the relevant positions of the associated sub-images on the mosaic screen from the linking information. Then, in a step 310, the respective sub-images are perceptibly marked on the screen.

Figure 5:
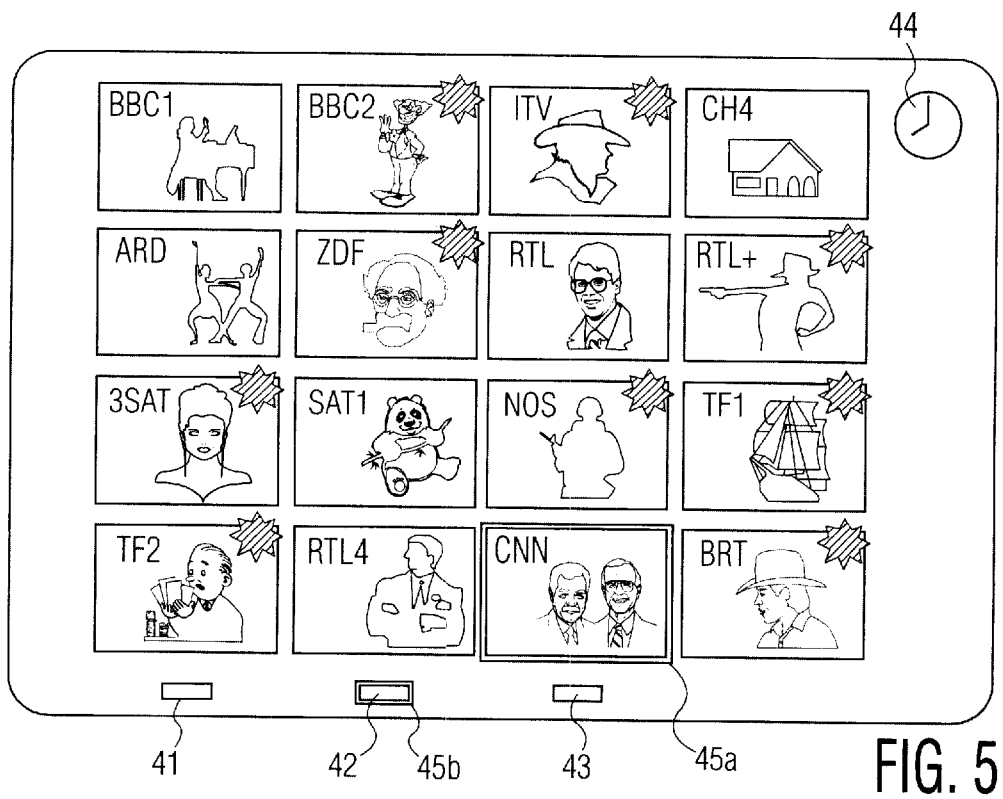
Figure 6:
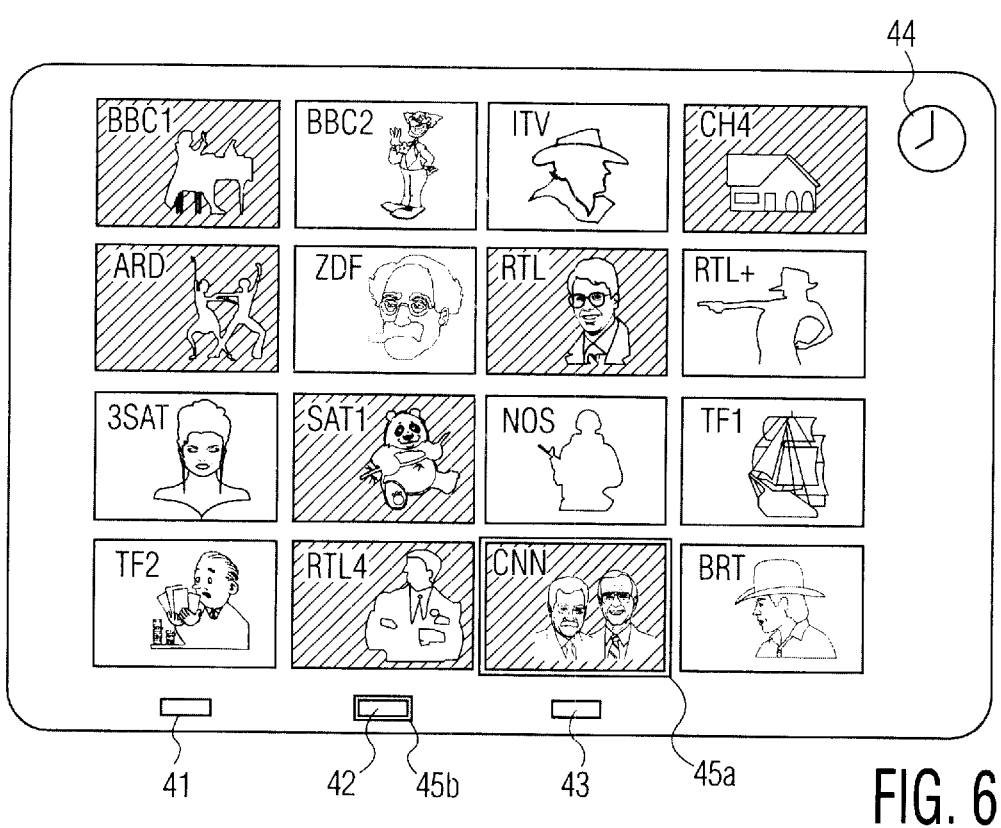

In one embodiment of the invention, the marking of sub-images in step 310 is achieved by causing the graphics generator to display a special symbol close to said sub-images. An example is shown in FIG. 5. It will be appreciated that various alternatives are possible, such as displaying a colored border line around the sub-images or their channel names. In an advantageous embodiment, the sub-images representing the desired program are distinguished from the others by reducing the visibility of the other sub-images. In this embodiment, the microprocessor causes the brightness mask generator (30 in FIG. 1) to generate a brightness mask signal B which reduces the brightness of the displayed video signal in those screen areas where the sub-images of the non-desired television programs are displayed. This is shown in FIG. 6 in which shaded areas denote sub-images having a reduced brightness. It will be appreciated that instead of the brightness, other display parameters of the sub-images such as contrast, color saturation or hue may be reduced. Upon marking the relevant sub-images, the control program returns to the step 304 to allow the user to select a full-screen program from the mosaic screen (step 307) or return to the previous program (step 305).

Figure 7:
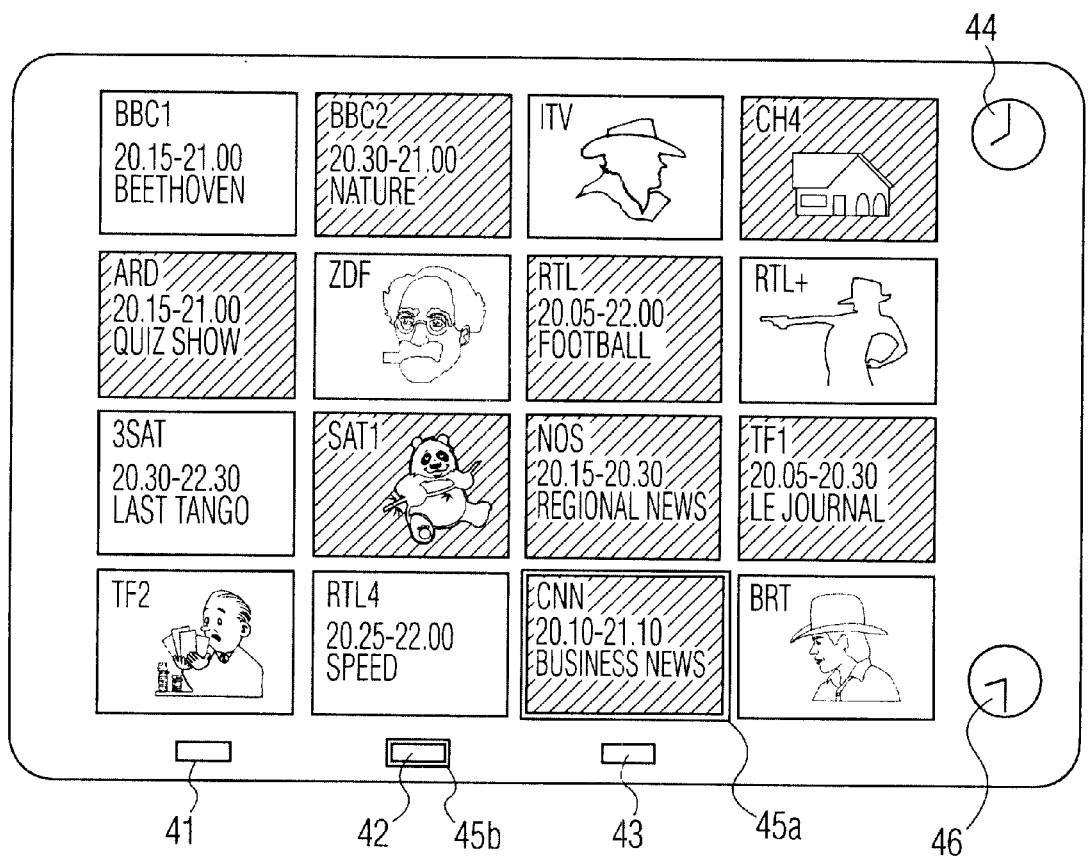

In a step 311, the microprocessor determines whether the activated on screen button is the "next" button (41 in FIG. 4). In that case, the program executes a step 312 in which the receiver displays a "What's On Next" overview. The term "next" may refer to a television program or a specified point of time. In the first option, the microprocessor searches in the EPG database and for each television channel, the next program that it will be broadcasting. As there are no seal-time sub-images available for these programs, all of them are presented in textual form while maintaining the mosaic structure the user is so familiar with. Advantageously, the "next" overview is combined with the marking feature described above. In the second option, the microprocessor searches in the EPG database the program which will be broadcast at the specified point of time, e.g. half an hour from now (20.30 hrs. in this example). In this embodiment, various programs which are currently being broadcast will not have been finished by then. For these programs, the actual real-time sub-image may be continued to be displayed on the mosaic screen. The other programs are presented in textual form. An example of this embodiment is shown in FIG. 7. In this case, the channels ITV, CH4, ZDF, RTL+, SAT1, TF2 and BRT will still be broadcasting the current program at 20.30 hrs. The relevant sub-images are taken from the received mosaic signal, the brightness being reduced if the program is not a movie. The other channels will be broadcasting a different program at 20.30 hrs. The relevant EPG data (in the example: start time, end time, program title) are displayed within a window which over-rules the underlying sub-image of the received mosaic signal. Again, the window is displayed in reduced brightness if the announced program is not a movie. A clock 46 denotes the point of time to which the overview applies. The control program then returns to the step 304 to allow the user to select a full-screen program from the mosaic "next" overview (step 307) or return to the previous program (step 305).

Figure 8:
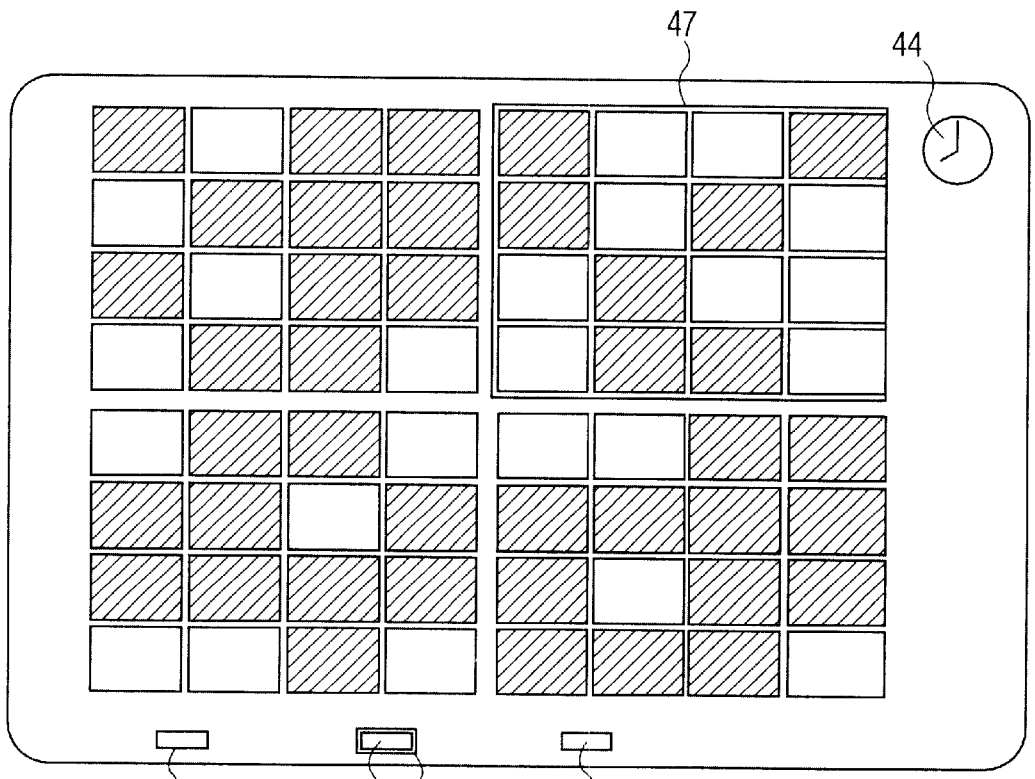
Figure 9:
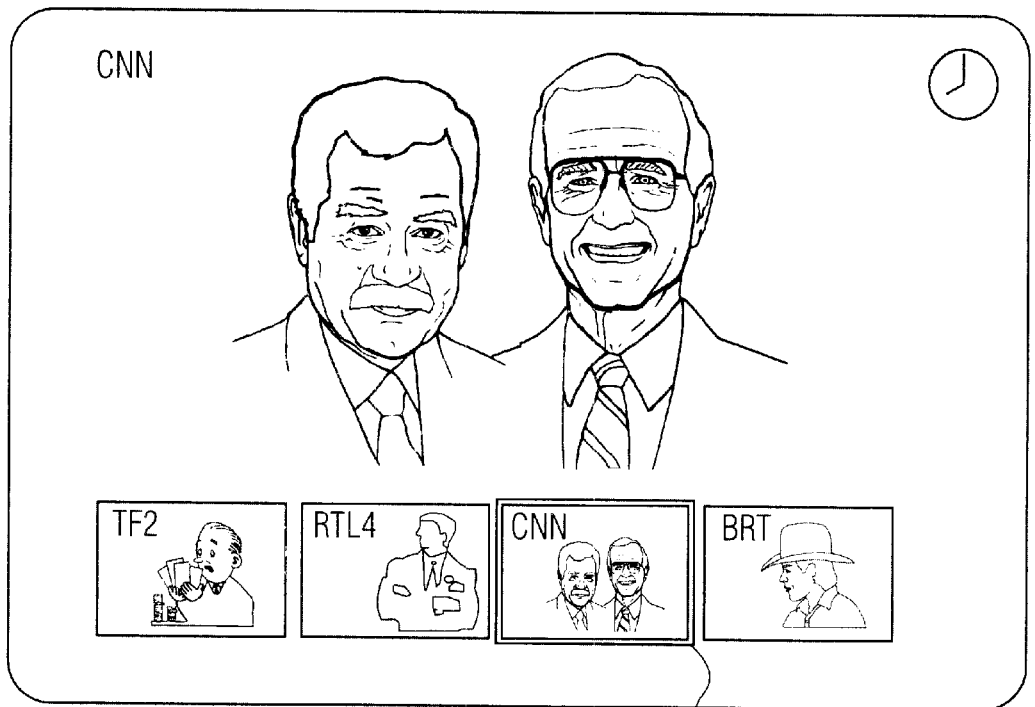

Other processing functions are performed in a step 313 if the microprocessor has found that the activated on-screen button is not the "theme" or "next" button. One of the other on-screen buttons is the "zoom" button (43 in FIG. 4). The zoom function enables the user to select a **4\*4 mosaic screen from a larger number of receivable television channels. This is shown by way of example in FIG. 8 in which the zoom button allows selection of one the four quadrants of an 8\*8 mosaic screen by means of a cursor 47. The user will appreciate that the marking feature is also implemented in this 8\*8 mosaic screen mode. Although the sub-images are too small to recognize the television program, it is immediately clear in which quadrant most movies can be found. The zoom function also enables the user to select a row or a column from a mosaic screen for simultaneous display with a selected "full-screen" television program. An example is shown in FIG. 9**. In this display mode, the user can easily "zap" from one television program to another.

In the above description of the invention, the mosaic signal is composed by the transmitter and transmitted as such. It will be appreciated that the mosaic signal may also be locally composed by the receiver. The same applies to the channel names identifying the sub-images. Such receivers are known per se in the art. They are arranged to simultaneously or sequentially receive the available television channels, process the signals to create respective sub-images and store said sub-images in a field or frame memory. In such a receiver, other methods of marking desired television programs (310 in FIG. 3) are possible. For example, the refresh rate or the size of the relevant sub-images may be reduced.

In summary, a method of navigating through television programs is disclosed. A television receiver displays a mosaic image with sub-images representing the available programs. The receiver further receives an electronic program guide with program descriptions. Upon activating a "theme" button (42), the viewer can enter a desired program type, e.g. "movie". In response thereto, the brightness of the sub-images representing programs that are not desired is reduced. The user is thus assisted in navigating through programs he is interested in, while maintaining the mosaic structure he is familiar with, and without losing the association between channels and their positions on the mosaic screen.

What is claimed is:

1. A method of navigating through television program guide data comprising the steps of:

receiving electronic program guide data including a scheduled broadcast time and one or more descriptors defining respective properties of said television programs;

storing at least a portion of said data in memory;

receiving user commands containing selection criteria identifying a selected time and a selected descriptor value;

receiving a command to display images associated with television programs that meet said user specified criteria;

correlating said user-specified criteria with the television program data in memory to identify the programs that meet said selection criteria;

perceptibly marking the sub-images corresponding with television programs having the selected descriptor value at the selected time;

receiving a command indicating that one of said sub-images has been selected; and reproducing the sound signal of the television program associated with a user-selected one of said sub-images;

further comprising the step of simultaneously displaying a selected row or column of said plurality of sub-images and a television program selected from said row or column.

2. A method as claimed in claim 1, wherein the step of marking comprises establishing a refresh rate of the sub-images corresponding with television programs meeting said user-selection criteria that is higher than the refresh rate of sub-images corresponding with television programs not meeting said user-selection criteria.

3. A method as claimed in claim 1, wherein the step of perceptibly marking comprises setting the size of said sub-images corresponding with television programs meeting said user-selection criteria that is larger than the size of said sub-images corresponding with television programs not meeting said user-selection criteria.

\* \* \* \* \*